(12) United States Patent
Jethanandani et al.

(10) Patent No.: US 11,146,623 B2
(45) Date of Patent: Oct. 12, 2021

(54) INTELLIGENT DISTRIBUTION OF VIRTUAL NETWORK FUNCTION IMAGES

(71) Applicant: VMWARE, INC., Palo Alto, CA (US)

(72) Inventors: Mahesh Jethanandani, Palo Alto, CA (US); Sachin Thakkar, Palo Alto, CA (US); Venu Gopala Rao Kotha, Bangalore (IN); Akshatha Sathyanarayan, Palo Alto, CA (US); Shruti Parihar, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/823,341

(22) Filed: Mar. 19, 2020

(65) Prior Publication Data

US 2021/0218798 A1 Jul. 15, 2021

(30) Foreign Application Priority Data

Jan. 15, 2020 (IN) .............................. 202041001768

(51) Int. Cl.
*G06F 15/173* (2006.01)
*H04L 29/08* (2006.01)

(52) U.S. Cl.
CPC ................................ *H04L 67/1002* (2013.01)

(58) Field of Classification Search
CPC ............. H04L 67/1002; H04L 41/0213; H04L 29/08072; H04L 29/06; H04L 41/12
See application file for complete search history.

(56) References Cited

U.S. PATENT DOCUMENTS

| 8,904,081 | B1* | 12/2014 | Kulkarni | G06F 9/45558 |
| | | | | 711/6 |
| 8,990,290 | B1* | 3/2015 | Mikkilineni | G06F 9/54 |
| | | | | 709/203 |
| 9,218,616 | B2* | 12/2015 | Van Biljon | H04L 63/102 |
| 9,268,590 | B2* | 2/2016 | Du | H04L 43/04 |
| 9,276,900 | B1* | 3/2016 | Daud | H04L 61/2023 |
| 10,241,709 | B2* | 3/2019 | Scales | G06F 3/0644 |
| 10,432,699 | B2* | 10/2019 | Griffith | G06F 9/45533 |
| 2013/0152047 | A1* | 6/2013 | Moorthi | G06F 11/368 |
| | | | | 717/124 |
| 2015/0019737 | A1* | 1/2015 | Kim | G06F 9/5061 |
| | | | | 709/226 |
| 2016/0373474 | A1* | 12/2016 | Sood | G06F 21/50 |
| 2017/0006083 | A1* | 1/2017 | McDonnell | H04L 67/1097 |
| 2017/0017512 | A1* | 1/2017 | Csatari | G06F 9/45558 |
| 2017/0163644 | A1* | 6/2017 | Horii | H04L 63/10 |
| 2017/0220371 | A1* | 8/2017 | Kosugi | G06F 9/5077 |

(Continued)

*Primary Examiner* — Razu A Miah
(74) *Attorney, Agent, or Firm* — Clayton, McKay & Bailey, PC

(57) ABSTRACT

An orchestrator process can efficiently distribute images of virtual network functions ("VNFs") in a telco network. The images can be accompanied by metadata that describes VNF requirements, such as computing requirements and functional characteristics. Based on the image metadata and location of a virtual infrastructure manager ("VIM"), the orchestrator can select a storage location and deploy the image to the storage location. The VIM can instantiate a corresponding VNF by retrieving the image. The orchestrator can track the storage location and cause the VIM to delete the image if the image is not used for a threshold period of time.

17 Claims, 5 Drawing Sheets

(56) References Cited

U.S. PATENT DOCUMENTS

| | | | |
|---|---|---|---|
| 2017/0289060 A1* | 10/2017 | Aftab | H04L 41/5054 |
| 2018/0018193 A1* | 1/2018 | Yabushita | G06F 11/20 |
| 2018/0159880 A1* | 6/2018 | Sood | H04L 41/28 |
| 2018/0165110 A1* | 6/2018 | Htay | G06F 8/65 |
| 2019/0037398 A1* | 1/2019 | Eriksson | H04L 63/0272 |
| 2020/0178198 A1* | 6/2020 | Ding | G07C 5/008 |
| 2020/0195524 A1* | 6/2020 | Clow | H04L 41/042 |
| 2020/0274783 A1* | 8/2020 | Sharma | H04L 43/0805 |

* cited by examiner

INTELLIGENT DISTRIBUTION OF VIRTUAL NETWORK FUNCTION IMAGES

RELATED APPLICATIONS

Benefit is claimed under 35 U.S.C. 119(a)-(d) to Foreign Application Serial No. 202041001768 filed in India entitled "INTELLIGENT DISTRIBUTION OF VIRTUAL NETWORK FUNCTION IMAGES", on Jan. 15, 2020, by VMware, Inc., which is herein incorporated in its entirety by reference for all purposes.

BACKGROUND

Telco networks are being leveraged to provide network connectivity to various devices. These devices can share the physical infrastructure of the telco network while running on network slices. Using network slicing, a network provider can partition the physical network to isolate tenant traffic and configure network resources at a macro level. Each slice can include a chain of virtual network functions ("VNFs") tailored to a particular use case. For example, Internet of Things ("IoT") devices, mobile broadband devices, and low-latency vehicular devices all need to share the 5G network and can utilize different VNFs for their respective functionality.

An orchestrator process, such as a Telco Cloud Orchestrator ("TCO"), can be responsible for providing VNF images that are used by Virtualized Infrastructure Managers ("VIMs") to instantiate VNFs within the network. These images can be quite large, such as on the order of Gigabytes, and with several of them, they can take up a significant space on any content library. Often, these images are not positioned in a content library close to the VIM. As a result, when the VIM attempts to instantiate a VNF, there can be a delay based on retrieving the relevant image or images from the TCO or some other remote location. On the other hand, not all images need to be placed close to all the VIMs, since different VIMs can tend to run different VNFs.

Currently, there is no method for the intelligent distribution of images used by VIMs. Instead, it is left up to the implementation to decide how and when the images get distributed. This can result in images not being permanently stored close to the VIM even though the VIM frequently instantiates the respective VNF. Instead, the VIM may repeatedly fetch images from the TCO on demand. This can be inefficient and slow, as the TCO may be slow to access when a VNF is booting up. Therefore, a more intelligent system is needed to decide which images need to be placed in a content library close to the VIM so that the VIM can get access to the image when it needs it. This is especially true in the 5G context, where demand for particular VNFs can dynamically change. For example, a VIM may need to rapidly instantiate many VNFs to service users at an event, such as a concert or sports contest. Slow instantiation due to inefficient image placement can adversely slow down network performance.

As a result, a need exists for systems and methods that intelligently distribute virtual network function images.

SUMMARY

Examples described herein include systems and methods for intelligent distribution of virtual network function images. In one example, the orchestrator can efficiently distribute VNF images such that they are available close to where they are needed. The orchestrator can determine placement location based on the design of the network, patterns of where VNFs are instantiated, and the requirements of the VNFs themselves. In one example, metadata provided by a VNF vendor can help in guiding where the images are placed. Additionally, the orchestrator can track storage locations of the images, allowing for efficient updates when images are upgraded. For example, an upgraded image can be provided to the same storage location.

In one example, the orchestrator can receive an image for a VNF based on links included in a Virtual Network Function Descriptor ("VNFD"). The image can be stored locally to the orchestrator in an example. The orchestrator can then deploy the image to a storage location that is selected based on metadata for the image and a location of a VIM. The metadata can be part of the VNFD or the retrieved image. The metadata can specify whether the VNF is used at the edge or in the core of the network, in an example. Other functional requirements of the VNF, such as resources needed, can also be identified. The orchestrator can identify one or more clouds within the network meeting these requirements. In one example, the VIM can be determined based on which cloud location the VNF will be instantiated in. When multiple VIMs service the cloud, computing availably at the VIM, such as number of VNFs being serviced, can be considered. Based on the VIM, a storage location can be identified. The storage location can be, for example, a nearest content library that is accessible by the VIM.

The orchestrator can notify the VIM of the storage location of the image. This notification can be part of deployment itself. For example, the orchestrator can deploy the image by instructing the VIM regarding the storage location where the image should be stored. The orchestrator can send the image to the VIM. The VIM can complete the deployment by sending the image to the storage location and sending a confirmation to the orchestrator. Alternatively, the orchestrator can send the image to the storage location without VIM assistance. In that instance, the orchestrator can separately notify the VIM of the storage location of the image. Alternatively, the VIM can request the image from the orchestrator, and the orchestrator can respond by notifying the VIM of the storage location. After receiving notice under any of these approaches, the VIM can retrieve the image from the storage location to instantiate the corresponding VNF, in an example. In one example, the VIM retrieves the image in response to a command from the orchestrator or other process.

The orchestrator can also track the storage location of the image. This can allow the orchestrator to upgrade deployed images and can also allow the orchestrator to notify a VIM of the image's storage location. As part of tracking the storage location, the orchestrator can track usage of the image. This can include receiving an acknowledgement that the image has been deployed, such as from the VIM. When the orchestrator later receives an upgraded image for a VNF, the tracking can allow for efficient image replacement. The orchestrator can deploy the upgraded image to the tracked storage location. The VIM can retrieve the updated image from the storage location to instantiate the VNF.

The orchestrator can also receive updates from VIMs regarding instantiation of VNFs. In one example, the orchestrator can determine the image has not been used to instantiate the VNF for a threshold period of time. Based on that, the orchestrator can send a message to the corresponding VIM to delete the image. This can free up capacity for storing VNF images that are being used at the VIM.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

The system can include an orchestrator, such as a TCO, that onboards a VNFD. The VNFD can identify one or more images corresponding to VNFs. The orchestrator can retrieve and store the images locally. Then the orchestrator can distribute the images to storage locations nearby VIMs where the corresponding VNFs are likely to be used. In one example, a placement engine can be used to determine where to place the VNF images.

The orchestrator can deploy an image to a storage location that is selected based on metadata regarding the requirements of the VNF and the VIM's location. The metadata can be retrieved from the VNFD or from the image itself, depending on the example. The metadata can be provided by the VNF vendor and can include VNF requirements that the placement engine uses to determine a placement location. For example, the metadata can specify that the VNF will operate at a particular cloud or at an edge or core cloud. Other VNF requirements, such as data plane requirements of particular resources, can also dictate which clouds are available for running the VNF. As another example, a VNF vendor for virtual Radio Access Network ("vRAN") can indicate in the metadata that the image be placed close to a VIM that is responsible for the Radio Access Network ("RAN"), such as in the edge of the network. Conversely, the metadata can indicate a VNF is used for a virtual router, which can exist in the edge, access, or core of the network.

The storage location can also be selected based on VIM location, such as by identifying a storage location nearby a VIM that is responsible for deploying the VNF. The orchestrator can also determine which VIMs service the available clouds. In cases where multiple VIMs manage the cloud, the VIM with the most available bandwidth (e.g., fewer VNFs managed) can be selected. For example, the choice can be based on available memory, storage, and scaling requirements of the VNF. The placement engine can then select a storage location, such as a content library utilized by the VIM, where the image can be stored. In one example, a content library can be shared between VIMs. In that case, the image can be distributed to the content library server and not the VIM itself. Alternatively, if no nearby content library exists, the storage location can be at the VIM itself. Therefore, the image placement can involve directing the orchestrator to send the image to a content library server or the VIM itself.

Figure 1:
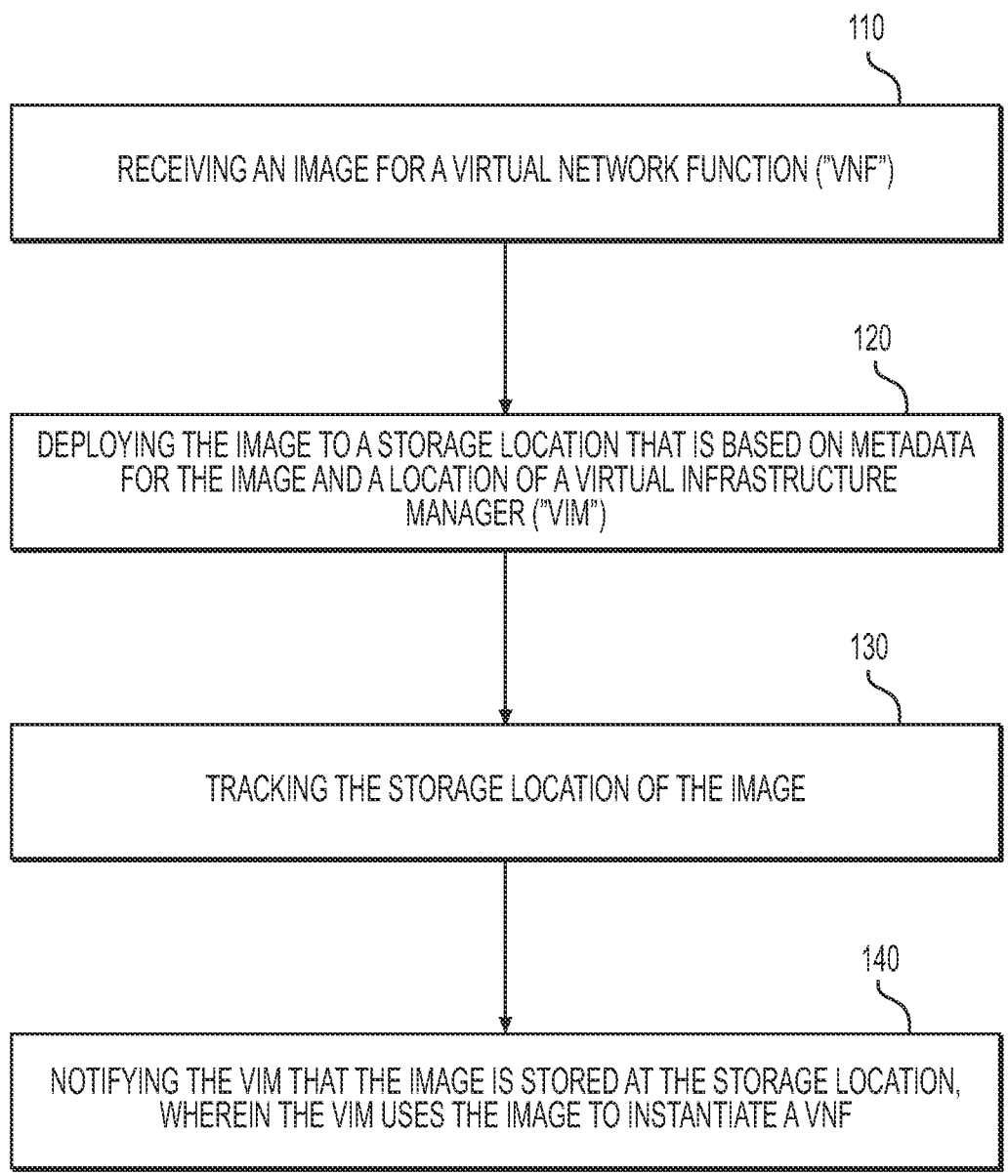
FIG. 1 is a flowchart of an example method for intelligent distribution of virtual network function images.

FIG. 1 is a flowchart of an example method for intelligent distribution of virtual network function images. At stage 110, an orchestrator, such as a TCO, can receive an image for a VNF. Many different VNFs can exist within a telco network. The orchestrator can create a catalog of VNFs needed in the network and onboard one or more VNFDs that identify the different images and their locations. In one example, a cloud service archive ("CSAR") file can include VNFD files, metadata, configuration information for the VNFs, licensing information, and certification files. The CSAR can be in a zipped file format in an example. For example, the CSAR can be a Topology and Orchestration Specification for Cloud Applications ("TOSCA") Simple Profile in a YAML format zipped file. In one example, the CSAR file can include a VNF image. Alternatively, the CSAR or VNFD can include links to the VNF images, in an example. For example, the links can be to a web server associated with a vendor of a particular VNF, where the associated image resides.

The CSAR or VNFD can include a virtual deployment unit ("VDU"), which can describe compute properties needed for a VNF. These properties are one example of metadata. For example, the compute properties can specify a needed disk size, such as 10 gigabytes ("GB"); a needed memory size, such as 2 GB; and a needed number of computer processing units ("CPUs"), such as two. The VNFD can also specify connection requirements for the VNF. For example, a VNF may require a network resource with a data plane that supports Single Root Input Output Virtualization ("SR-IOV").

At stage 120, the orchestrator can deploy the image to a storage location that is determined based on the metadata for the VNF image. This can involve determining which clouds are eligible to run the VNF. That eligibility can be based on network resource requirements for the VNF. As described for stage 110, the network resource requirements can be based on metadata of the VDU, and can include memory, storage, and scaling requirements of the VNF. The storage location can also be based on which VIM would manage the VNF at the eligible cloud. The storage location determined by the orchestrator can be at the VIM itself or at a content library that is accessed by the VIM. The content library can be a server in an example.

The orchestrator can utilize a placement engine to determine the storage location. The determination can include verifying a placement that is part of an existing network design plan. The placement engine can consider the compute properties and connections needed for the VNF. This can include checking capabilities of the clouds (i.e., nodes) where the VNF could be placed. For example, the placement engine can determine from the metadata that the VNF requires 1 TB of storage. The placement engine can then compare that requirement against available storage at various nodes where the VNF could be placed in order to narrow down the eligible nodes. The same can be done for other compute properties and connection requirements. Then, the placement engine can identify which VIMs and content library servers are associated with that node. If there is only one associated content library, that can be selected as the storage location. Likewise, if only a single VIM and no content library is associated with the node, then the storage location can be the VIM. If multiple VIMs or content libraries exist, then the placement engine can select the VIM or content library that has the most availability. For example, the VIM that currently manages the fewest VNFs or the content library with the most available storage space can be selected. In this way, the orchestrator can decide which VNF will be deployed by which VIM, and, correspondingly, where the image for the VNF will be deployed.

The placement engine can correlate VIMs and content libraries to particular nodes based on network design information that exists at the orchestrator. The orchestrator can be responsible for the design and layout of the network. The orchestrator therefore can have prior knowledge of which VNF is going to be deployed on which VIM, and in which cloud. In one example, the network design information is described in a network service descriptor ("NSD"). The NSD can be a file, such as a JSON or other file type. The NSD can be included in the CSAR in one example. The orchestrator can verify NSD placement specifications based on the metadata. When the NSD specifies a VNF for a cloud that cannot meet the compute requirements of the VNF, then a different storage location can be determined that does satisfy the requirements.

As an example, the NSD can indicate a router VNF and firewall VNF for deployment to a first cloud. The orchestrator can evaluate the compute requirements (e.g., CPU, storage, memory, and connectivity) for the router VNF and the firewall VNF to determine where to deploy the corresponding VNF images needs. The orchestrator can also examine the metadata information in the VNFD created by the vendor of the router VNF. That metadata can indicate, for example, that the image is intended for the edge of the network. A similar examination of the VNFD for the firewall VNF can reveal that the firewall VNF is intended for the edge of the network. The data plane for a particular VNF can require that the resource support SR-IOV, so the placement engine of the orchestrator can ensure that the cloud is capable of doing so. The placement engine can also verify that the eligible placement location at the cloud can meet a VNF storage requirement, such as 1 TB. In this way, the orchestrator can combine the knowledge of which VNF is deployed where with metadata information to queue the corresponding VNF images to an eligible content library at the cloud. This can result in a redesigned NSD in an example.

In one example, the content library can be shared by one or more VIMs. When a content library is shared between VIMs, the orchestrator can determine whether the image has already been sent to the content library for use by another VIM. If so, then the orchestrator can avoid sending a duplicate image.

At stage 130, the orchestrator can track the storage location of the image. This can include updating a database of information that maps images to particular VIMs and content libraries. Tracking the storage locations can allow for efficient updates in the future, when new images become available for particular VNFs. The updated database can differ from the VNF assignments that were specified in the original NSD.

In one example, when the image deployment is successful, the orchestrator can receive an acknowledgement. For example, to store an image at a content library, the orchestrator can contact the VIM, which negotiates storage with the content library. The VIM can send the acknowledgment to the orchestrator. Upon receiving the acknowledgement, the orchestrator can update a databased to indicate that the image is stored at the content library.

Additionally, the orchestrator can track which VNFs are instantiated based on reports from the VIMs. If an image is not used for a threshold time period, such as three hours, then the orchestrator can notify the respective VIM to remove the image. The image can be deleted from the storage location, freeing up space for VNF images that are being used by the VIM. The VIM can acknowledge the deletion and the orchestrator can update its database.

Where multiple VIMs exist for a cloud, selection of the VIM can be based on capabilities of the VIM. For example, the orchestrator can determine whether the VIM manages the nodes needed to run the particular VNFs. For example, if a first VIM manages edge nodes and a second VIM manages core nodes, then the type of node needed by the VNF can dictate which VIM is selected.

At stage 140, the orchestrator can notify the VIM that the image is stored at the storage location. This can allow the VIM to know where to access the image. In one example, when the VIM attempts to instantiate the VNF, it can contact the orchestrator to receive notification of the image location. Alternatively, during deployment at state 120, the orchestrator can notify the VIM of the storage location. In either example, this can allow the VIM to know where to retrieve the image for use in instantiating the VNF.

Figure 2A:
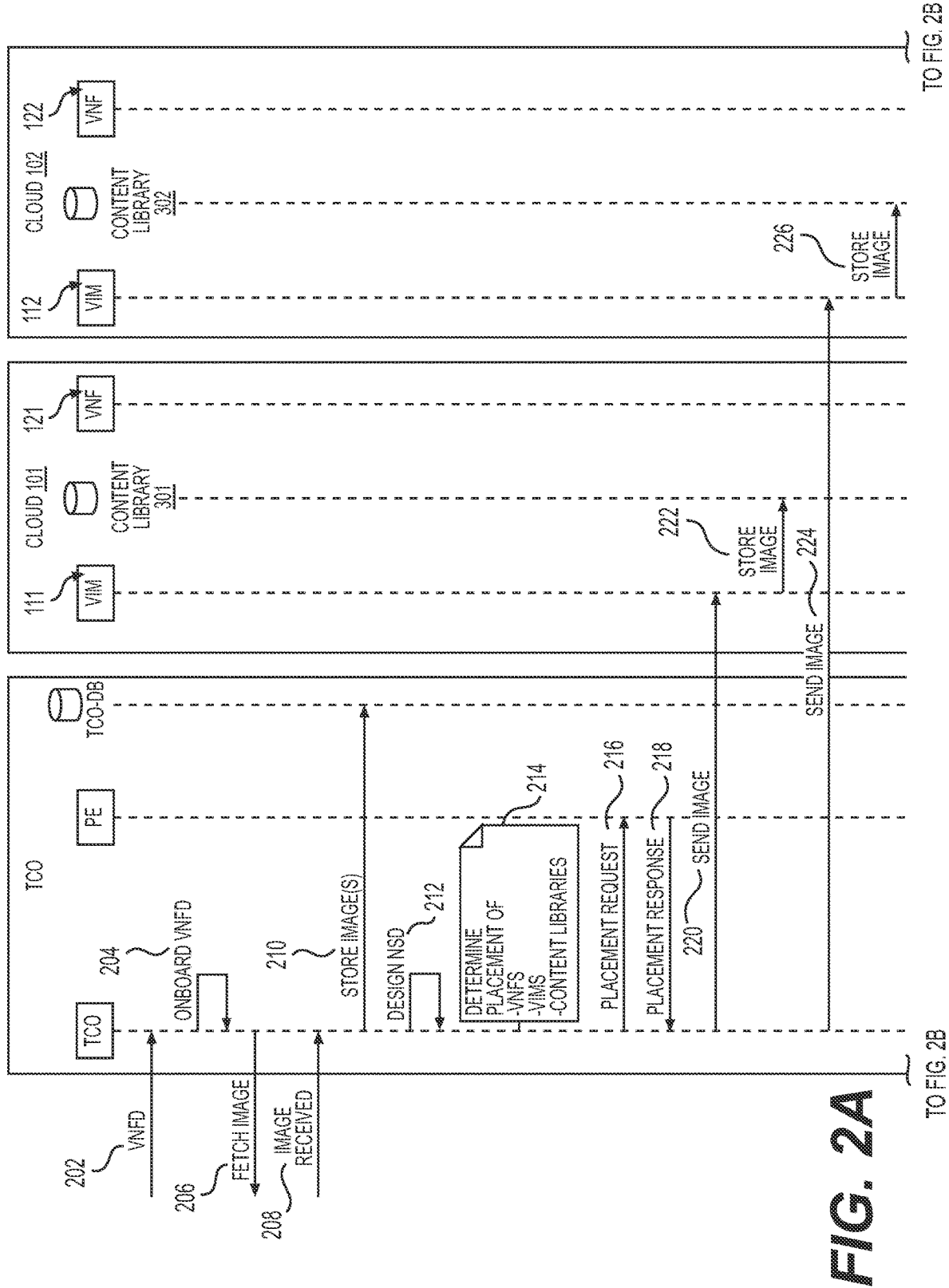
FIGS. 2A and 2B are sequence diagrams of an example method for intelligent distribution of virtual network function images.
Figure 2B:
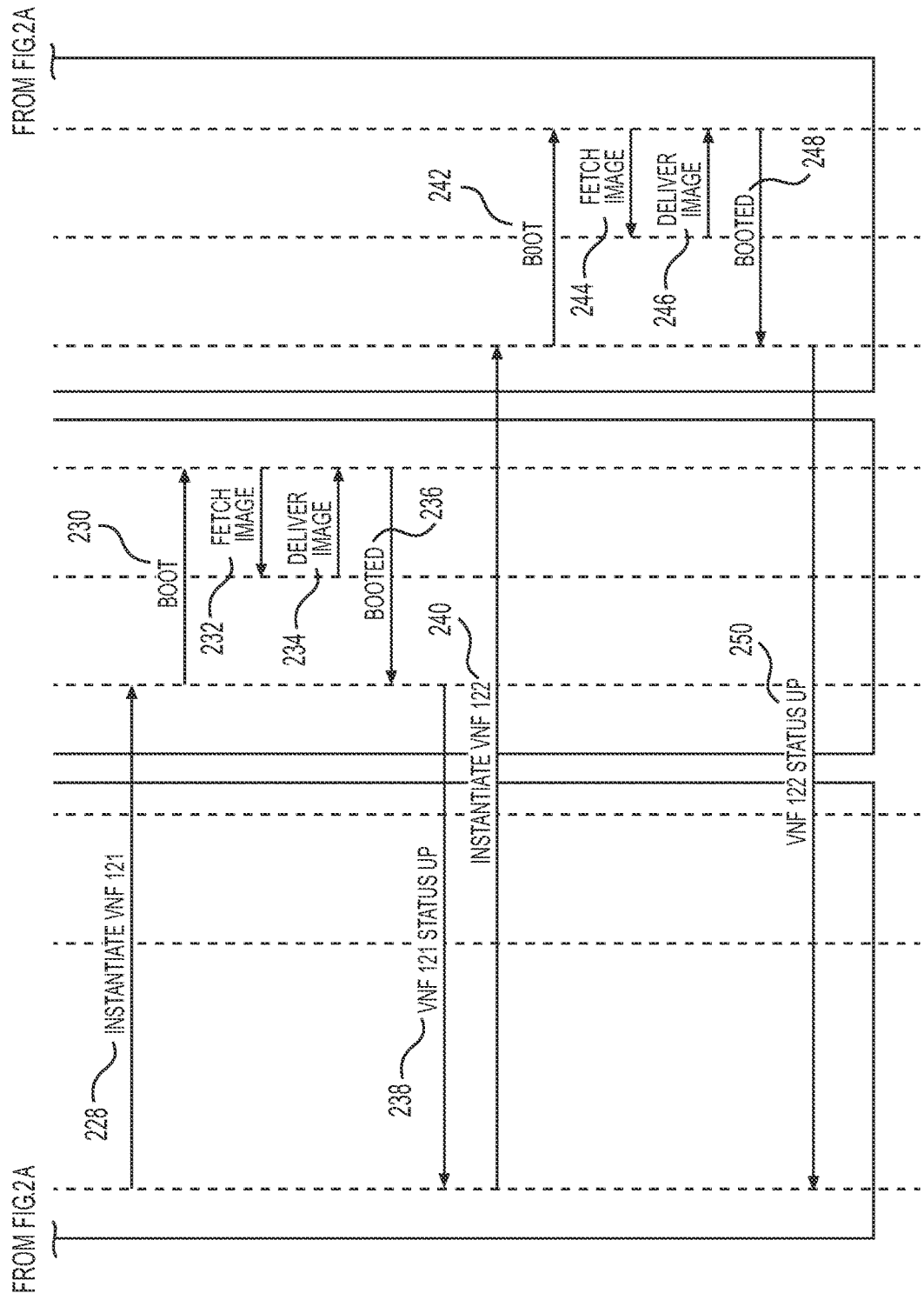

FIGS. 2A and 2B are sequence diagrams of an example method for intelligent distribution of virtual network function images. These stages can allow a TCO to deploy images to different content libraries 301, 302 in an example. At stage 202, the TCO can receive a VNFD. The VNFD can include a CSAR file in an example. The VNFD can describe one or more VNFs for use within the network. The VNFD can be onboarded at stage 204. This can include reading the CSAR. The CSAR can include metadata about VNFs and links to locations where their corresponding VNF images reside.

Based on a link, at stage 206 the TCO can retrieve an image. This can include supplying credentials at the link. The credentials, such as a certificate, can be included in the CSAR, in an example. Then, at stage 208, the TCO can receive the image. At stage 210, the image can be stored at a local database, indicated as TCO-DB in this example. The image can have an identifier or name that can allow the TCO to determine it has the image and version referenced in a VNFD. Stages 206, 208, and 210 can be repeated for any number of VNFs. In one example, multiple different VNFD files are onboarded at stages 202 and 204 as well. For example, different VNFD files can correspond to different vendors or even individual VNFs.

At stage 212, the TCO can determine which VIMs and clouds are available for placing the VNFs based on the network design indicated in the NSD. For example, the NSD can specify a router VNF and firewall VNF should be deployed in cloud 101. At stage 214, the TCO can evaluate placement of these VNFs based on the available VIMs and content libraries. For example, the TCO can determine that the NSD specifies content library 101 for both VNFs.

In addition, at stage 216 the TCO can examine the metadata information that is populated in the VNFD by the vender of the router VNF. In one example, this includes checking placement by making a placement request to the placement engine, which is labelled "PE" in FIG. 2A. The placement engine can be part of the TCO. The placement engine can read the metadata from the VNFD (or CSAR) and determine whether cloud 101 will support the VNF's requirements. For example, the metadata can indicate that the image is intended for the edge of the network. Cloud 101 can include an edge node. As a result, at stage 218 the placement response can indicate that the image be deployed to content library 301 in cloud 101.

Stages 216 and 218 can be done as part of designing the NSD at stage 212, in an example. Designing the NSD can include determining where each VNF needs to be deployed, the VIM 111 or 112 that will manage the VNF, and the content library 301 or 302 where the image will be stored. As part of that design stage, the placement engine can read the metadata provided in the VNFD to make sure the image can be deployed in the location determined by the NSD.

In one example, the TCO can consider where to deploy images for multiple VNFs prior to deploying a first one of those VNFs. This can allow certain images to be prioritized at certain locations. For example, at stage 216 and 218, the placement engine can determine that the firewall VNF has compute requirements that match with cloud 102. This can cause the TCO to update the NSD design at stage 212 to specify cloud 102 for the firewall VNF.

Once the TCO has the details of the network design, the TCO can deploy the images in the correct VIM 111 or 112 and content library 301 or 302 at stage 220. At stage 220, the TCO can then send the image for the router VNF to the VIM 111 in cloud 101 with instructions to store the image at the content library 301. The VIM 111 can queue the image to content library 301, causing the image to be stored at the content library 301 at stage 222. Although not pictured, the VIM 111 can respond to the TCO with an acknowledgement that the image was successfully deployed to the content library 301. The TCO can then update a database, such as TCO-DB, with information that maps the image to content library 301.

Likewise, the TCO can send the image for the firewall VNF to the second VIM 112 in cloud 102 at stage 224. The second VIM 112 cam store the image at the second content library at stage 226 and send an acknowledgment back to the TCO. The TCO can then update its own database information to reflect that the image for the firewall VNF is stored at content library 302.

The TCO can deploy the images at stages 220 and 224 before instructing the VIMs 111, 112 to instantiate the VNFs. In this manner, when one of the VNF instances starts to boot, the respective VIM 111, 112 can find the image it needs close by in content library 301, 302.

Continuing with FIG. 2B, at stage 228 the TCO can send a message to VIM 111 to instantiate VNF 121 (e.g., the router VNF). In one example, the message includes notification of the storage location for the image corresponding to VNF 121. Alternatively, the VIM 111 can already know the storage location for the image based on being notified at stage 220. In this example, the storage location is content library 301.

To boot the VNF 121 at stage 230, the VIM 111 can fetch the image at stage 232 from content library 301. The content library 301 can deliver the image at stage 234. The image can be used at stage 236 to complete the boot of the instance of VNF 121. The VIM 111 can then send a VNF status update to the TCO at stage 238. This can allow the TCO to track the utilization of the image. The utilization can dictate whether the image for VNF 121 continues to be stored at content library 301. For example, if a threshold period of time passes without an instantiation of VNF 121, the TCO can send a message to VIM 111 to delete the corresponding image from content library 301. This can free up space for more frequently used images. Likewise, the TCO can update the NSD such that the image is not loaded at the content library 301 in the future. Alternatively, if VIM 111 reports instantiation of VNFs based on images that are not located at content library 301, the TCO can send those images to the content library 301 as described in stages 220 and 222. The storage locations of the images can be tracked in the TCO database.

The TCO can also cause VIM 112 to instantiate VNF 122 (e.g., the firewall VNF) in cloud 102 at stage 240. VIM 112 can begin booting the VNF 122 at stage 242. This can include fetching the corresponding image from the content library 302 at stage 244. That storage location can be indicated in the instantiation request, in an example. The content library 302 can deliver the image at stage 246 and the VNF 122 can complete booting at stage 248. The VIM 112 can provide a VNF status update at stage 250, indicating that VNF 122 was instantiated. Tracking instantiation of VNF 122 can help the TCO determine whether to keep the image at content library 302, as explained above with regard to stage 238.

In this manner, the TCO can make intelligent decisions regarding which images need to be placed at which storage locations. This can save space in the content libraries 301, 302. It can also prevent duplication of images in content libraries 301, 302 that do not need the images and allows for fast access to an image when a VNF starts to boot. Additionally, when images need to be updated, the updated images can be delivered to the same storage locations, which are tracked by the TCO.

Similarly, for maintenance cycles, the orchestrator can instruct a VIM to reboot and pick the updated image from the storage location. The orchestrator can wait for acknowledgement of successful image deployment before initiating a maintenance cycle, in an example.

Figure 3:
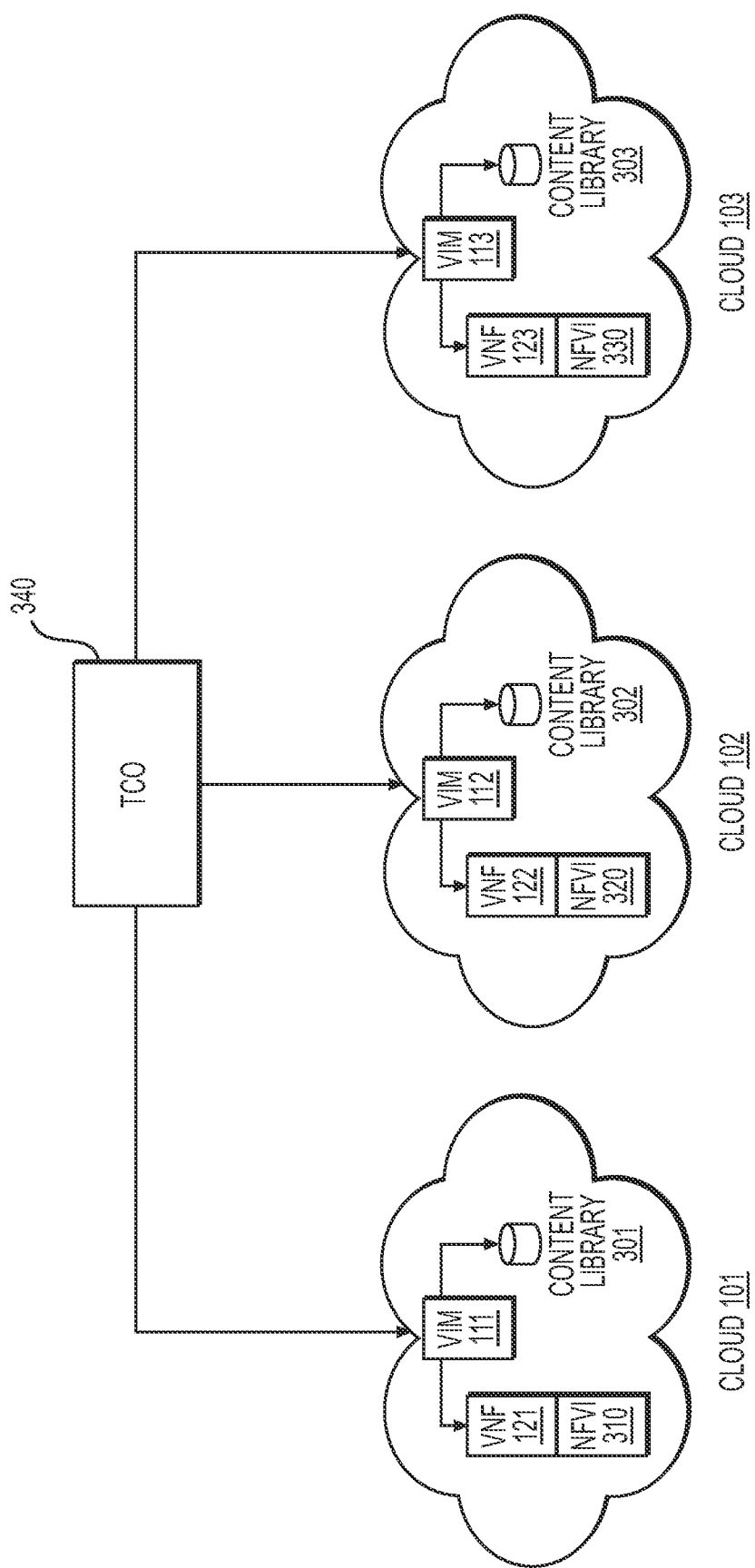
FIG. 3 is an example diagram of system components for intelligent distribution of virtual network function images.

FIG. 3 is an example diagram of system components for intelligent distribution of virtual network function images. The TCO 340 can be responsible for onboarding VNF images from third party VNF vendors. The TCO 340 can then distribute those images to storage locations that will provide efficient network operation. These locations can be based on which VNF should be located in which cloud and instantiated by which VIM.

In the example of FIG. 3, the TCO 340 can decide that VNF 121 belongs in cloud 101. As a result, the image can be stored at a storage location near VIM 111. In this example, the storage location is at content library 301. This can allow VIM 111 to more efficiently instantiate VNF 121. The VNF 121 can be instantiated in a virtual layer and run on top of network function virtualization infrastructure ("NFVI") 310. NFVI 310 can include hardware and software components, in an example, defining virtual and physical layers. The NFVI 310 can include infrastructure points-of-presence where VNFs, such as VNF 121, can be deployed. NFVI networks can interconnect VNFs and underlying network resources, in an example.

Likewise, the TCO 340 can decide that VNF 122 belongs in cloud 102. Therefore, a storage location is chosen in proximity to VIM 112. The storage location can be content library 302, which gets accessed by VIM 112. VIM 112 can instantiate VNF 122 based on retrieving the image from the efficiently located content library 302. The instantiated VNF 122 can run on NFVI 320, in an example.

The TCO 340 can also manage which VNF images are deployed to cloud 103. In this example, the TCO 340 can determine that an image for VNF 123 should be stored in cloud 103. Based on the TCO's 340 model of the network, such as from the NSD, the TCO 340 can determine that VIM 113 will instantiate VNF 123. As a result, the TCO 340 can select a storage location that is locally accessible by VIM 113 and deploy the image for storage at that location. In this example, the storage location is content library 303. The VIM 113 can then instantiate VNF 123 by retrieving the image from content library 303. VNF 123 can run on NFVI 330.

The TCO 340 can correspond with VIMs 111, 112, 113 to instantiate VNFs 121, 122, 123 as needed in the different clouds 101, 102, 103. With this approach, VNFs 121, 122, 123 can boot efficiently based on their respective VIMs 111, 112, 113 having convenient access to the corresponding images. The content libraries 301, 302, 303 can be located close to the respective VIMs 111, 112, 113. This can allow each of these VIMs 111, 112, 113 to easily access the relevant VNF images.

Additionally, VIMs 111, 112, 113 can report back to TCO 340 to indicate which VNFs 121, 122, 123 are instantiated. The TCO 340 can track image usage based on these reports. If an image is not being accessed for a period of time, such as three hours or a day, then the TCO 340 can send a message to the corresponding VIM 111, 112, 113 to cause the deletion of the image from the corresponding content library 301, 302, 303. The TCO 340 can update its own database to indicate that the image is now stored locally at the TCO 340. When the image is needed in the future, the TCO 340 or some other process can provide the image to the requesting VIM 111, 112, 113 from the TCO 340 database.

The TCO 340 can also update images based on tracking their storage locations. For example, if the TCO 340 receives an updated image for VNF 121, the TCO 340 can look up the storage location for the VNF 121 image. Then the TCO 340 can deploy the updated image to content library 301, such as by sending the image to VIM 111 and notifying VIM 111 of the storage location. The VIM 111 can delete the prior image for VNF 121 and replace it with the updated image. The VIM 111 can send an acknowledgement to the TCO 340, allowing the TCO 340 to update its records regarding the image version stored at content library 301.

The TCO 340 can track image versions in addition to storage locations. This can allow the TCO 340 to ensure that old images are completely replaced when an updated image is available. As images are replaced with an updated image, the version numbers can be changed in the TCO 340 database. The TCO 340 can stagger updates based on VNF demand. For example, if a VIM 112 is using an image in content library 302 at a high rate during daytime hours, the TCO 340 can wait until a relative downtime at night to provide the updated image to VIM 112, in an example. In one example, the TCO 340 can track the number of instances of a VNF that have been instantiated and correlate those to the image version. In one example, the TCO 340 can confirm that all active instances of the VNF that were running an older image have been upgraded prior to deleting the older image.

Figure 4:
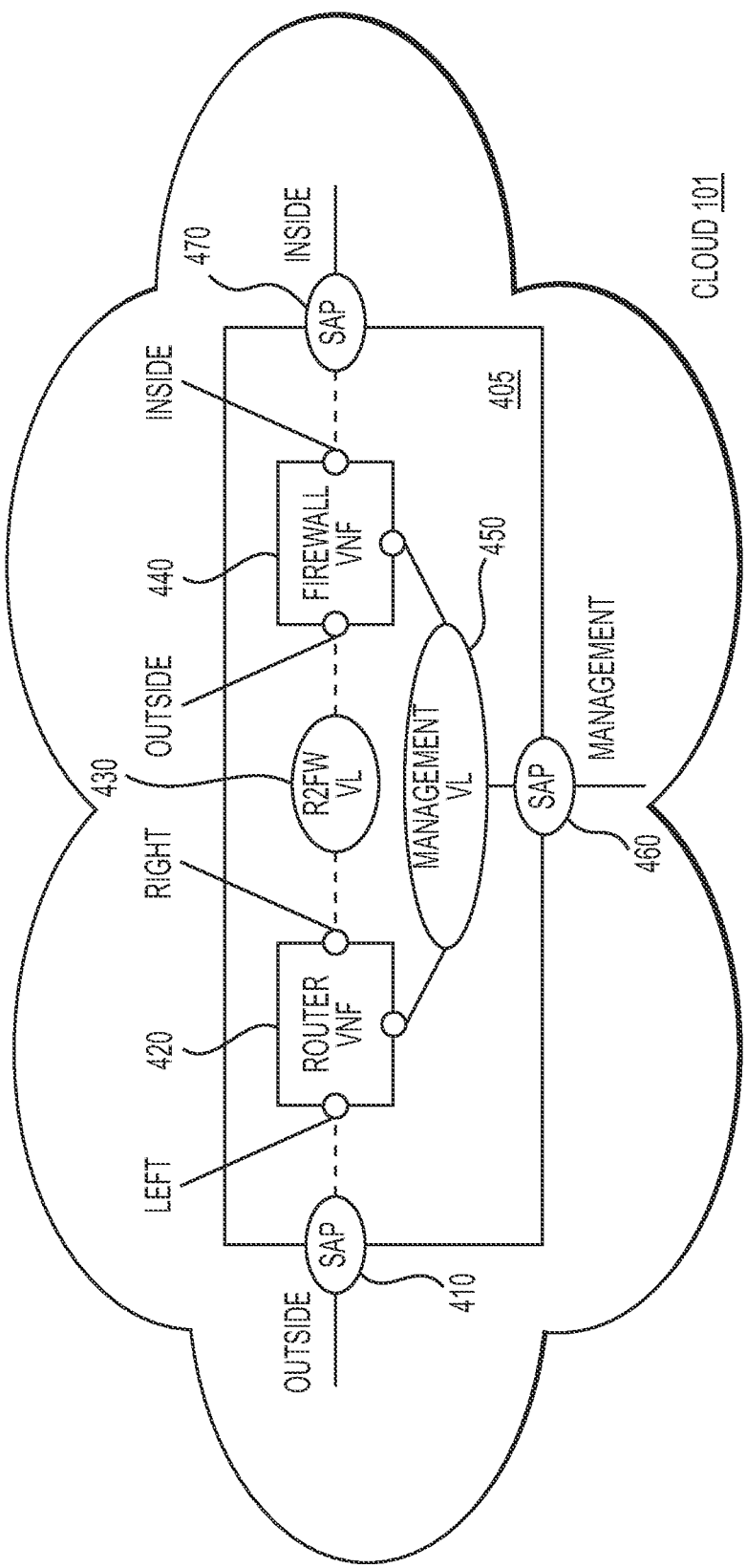
FIG. 4 is an example diagram of system components for intelligent distribution of virtual network function images.

FIG. 4 is an example diagram of system components for intelligent distribution of virtual network function images. In this example, multiple VNFs can be deployed within cloud 101 to set up a service chain 405 in a virtual layer of the telco network. The orchestrator can know the combination of VNFs that need to exist together in cloud 101 for the service to function. This can be dictated, for example, based on the NSD. Additionally, combinations of VNFs and other virtual machines ("VMs") can be specified in the VNFD, in an example.

In the example of FIG. 4, the NSD can specify a router VNF 420 and a firewall VNF 440 to deploy to cloud 101. As part of the NDS design, the orchestrator can evaluate whether the router VNF 420 and the firewall VNF 440 images need to be deployed in a particular content library or to a particular VIM. The orchestrator can include a placement engine that evaluates metadata information populated in the VNFD of the VNF vendor for the router VNF 420. That metadata can include information that tells the orchestrator that the image is intended for the edge of the network, as an example. A similar examination of the VNFD for the firewall VNF 440 can reveal that the firewall VNF 440 is intended for the edge of the network. The orchestrator can check that edge nodes exist in cloud 101 that meet the compute requirements of the VNFs 440, 460. The orchestrator can therefore combine the knowledge of which VNF is deployed where, with metadata information it has received as part of the VNFD to queue the image to a content library in cloud 101.

A service chain 405 can be a collection of virtual components, such as VNFs and VMs, that operate together to perform a specific network task. In some examples, the telco network can have different slices for different tenants. Each tenant can have its own services that it provides over the network. The service chain 405 can be customized for a particular service. A service chain 405 can be provided together in a single cloud, such as cloud 101, or can span multiple clouds in an example. The virtual components of the service chain 405 can operate on the same or different underlying physical network components. The virtual components can dynamically move to physical network components that are capable of meeting compute requirements of the virtual components, in an example.

In the example of FIG. 4, the service chain 405 can include a router VNF 420 and a firewall VNF 440. These VNFs 420, 440 can work together in an example to provide managed access to inside of a private network based on traffic coming from outside of that network. From a protection standpoint, it can make sense to route the outside traffic through a firewall to limit what traffic can reach the inside of the private network.

A first service access point ("SAP") 410 can receive outside traffic. The first SAP 410 can be a connection point ("CP") where a network service can be accessed. The first SAP 410 can be linked to an input to the router VNF 420. An SAP 410 can operate as a virtualization of an interface or port on a physical device. The first SAP 410 can be the point through which users or other entities can access the virtual service represented by service chain 405. The first SAP 410 can listen for traffic to the service and be configured to send the traffic to the first VNF in the service chain 405, which in this case is the router VNF 420. The router VNF 420 can have an output linked to an input of the firewall VNF 440. In this example, VNF connection points are indicated by LEFT and RIGHT for the router VNF 420. VNF connection points are indicated as OUTSIDE and INSIDE for the firewall VNF 440.

The router VNF 420 can be linked to the firewall VNF 440 through use of a virtual link ("VL") 430. In this example, the VL 430 can include a VM that is configured to send router traffic to the firewall ("R2FW"). Traffic meeting certain requirements can then pass through the firewall VNF 440 to the inside of the private network based on a second SAP 470. In one example, traffic coming from the inside of the network can pass back through the service chain 405 based on entering from the second SAP 470, passing through the firewall VNF 440, to the router VNF 420, and back to the outside of the service chain 405 through the first SAP 410.

The service chain 405 can also include a management VL 450 through which a management process can access the router VNF 420 and firewall VNF 440 for configuration purposes. For example, this can allow for new router and firewall settings to be submitted to the VNFs 420, 440. The management VL 450 can be made up of a set of connection points in an example. The connection points can be defined as part of the VNFD, in an example. The management VL 450 therefore need not have a separate image, in an example. A third SAP 460 can serve as ingress and egress for management traffic at the service chain 405.

In one example, the orchestrator can know in advance how the service chain will be configured, such as based on the NSD or VNFD. The orchestrator therefore can know that both VNFs 420, 440 will be needed at cloud 101. Based on the design of the network, the orchestrator can identify a VIM and a content library in cloud 101, such as VIM 111 and content library 301 from FIG. 3. The orchestrator can then provide images for VNFs 420, 440 from the orchestrator database to the VIM, for storage at the content library. The orchestrator can notify the VIM of this storage location. Once the image has been successfully stored, the VIM can send an acknowledgement to the orchestrator. The orchestrator can update its database to track that the images for the VNFs 420, 440 are located at the content library.

Distributing of images in this intelligent manner can save content space in the content library and prevent duplication of images in content libraries that do not need them. Storing the images near the VIM can also allow for fast access to the image once the VNF starts to boot up. As has been described, the orchestrator can track usage of the images. If a non-use threshold is reached, such as four hours of non-use, the orchestrator can send a message to the VIM to remove the image. This can make room for more heavily used images in the content library.

The CPs mentioned in FIG. 4 (such as the SAPs 410, 460, 470 and VL 430) can be implemented by the VIM without use of an image, in an example. These CPs can be simpler, smaller, and functionally less customized compared to the VNFs 420, 440.

For maintenance purposes, the images may need to be upgraded from time to time.

The orchestrator can check its database that it updated at the time of image distribution to decide which images need to be updated. The orchestrator can also determine where the images reside based on the database records. This can allow the orchestrator to schedule updates and notify VIMs to replace images at the tracked storage locations.

The orchestrator can maintain a copy of all the images locally. This can allow the orchestrator to supply VIMs with images when those images are not located in the content library, for example.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for orchestrating image distribution in a network, comprising:
   receiving an image for a Virtual Network Function (VNF); deploying the image to a storage location that is selected based on at least: metadata for the image, and a location of a Virtual Infrastructure Manager (VIM);
   tracking the storage location of the image; and notifying the VIM of the storage location for the image, wherein the VIM retrieves the image from the storage location to instantiate the VNF; and
   wherein the image metadata is used to validate placement of the VNF in the storage location, wherein the storage location is accessible by the VIM, and wherein the validation is performed by a placement engine that compares compute requirements in a Virtual Deployment Unit (VDU) for the VNF with compute capabilities at a cloud identified in a Network Service Descriptor (NSD).

2. The method of claim 1, further comprising:
   receiving an upgraded image for the VNF; and
   deploying the upgraded image to the tracked storage location, wherein the VIM retrieves the updated image from the storage location to instantiate the VNF.

3. The method of claim 1, wherein the storage location is a content library associated with the VIM.

4. The method of claim 1, wherein the image metadata indicates edge deployment, and wherein the storage location is selected based on proximity to an edge node of the network.

5. The method of claim 1, further comprising:
   determining a threshold amount of time has passed since the VNF deployment of the image has not been used to instantiate the VNF for a threshold period of time; and
   sending a message to the VIM to delete the image.

6. The method of claim 1, wherein the VIM is identified as a closest of multiple VIMs to a location identified in the image metadata, and wherein deploying includes sending the image to the VIM for placement at the storage location.

7. A non-transitory, computer-readable medium containing instructions that, when executed by a hardware-based processor, performs stages for orchestrating image distribution in a network, the stages comprising:
   receiving an image for a Virtual Network Function (VNF);
   deploying the image to a storage location that is selected based on at least: metadata for the image, and a location of a Virtual Infrastructure Manager (VIM);
   tracking the storage location of the image; and
   notifying the VIM of the storage location for the image, wherein the VIM retrieves the image from the storage location to instantiate the VNF; and
   wherein the image metadata is used to validate placement of the VNF in the storaqe location, wherein the storaqe location is accessible by the VIM, and wherein the validation is performed by a placement engine that compares compute requirements in a Virtual Deployment Unit for the VNF with compute capabilities at a cloud identified in a Network Service Descriptor (NSD).

8. The non-transitory, computer-readable medium of claim 7, the stages further comprising:
   receiving an upgraded image for the VNF; and
   deploying the upgraded image to the tracked storage location, wherein the VIM retrieves the updated image from the storage location to instantiate the VNF.

9. The non-transitory, computer-readable medium of claim 7, wherein the storage location is a content library associated with the VIM.

10. The non-transitory, computer-readable medium of claim 7, wherein the image metadata indicates edge deployment, and wherein the storage location is selected based on proximity to an edge node of the network.

11. The non-transitory, computer-readable medium of claim 7, the stages further comprising:
determining the image has not been used to instantiate the VNF for a threshold period of time; and
sending a message to the VIM to delete the image.

12. The non-transitory, computer-readable medium of claim 7, wherein the VIM is identified as a closest of multiple VIMs to a location identified in the image metadata, and wherein deploying includes sending the image to the VIM for placement at the storage location.

13. A system for orchestrating image distribution in a network, comprising:
a memory storage including a non-transitory, computer-readable medium comprising instructions; and
a computing device including a hardware-based processor that executes the instructions to carry out stages comprising:
receiving an image for a Virtual Network Function (VNF);
deploying the image to a storage location that is selected based on at least: metadata for the image, and a location of a Virtual Infrastructure Manager (VIM); tracking the storage location of the image; and
notifying the VIM of the storage location for the image, wherein the VIM retrieves the image from the storage location to instantiate the VNF; and
wherein the image metadata is used to validate placement of the VNF in the storage location, wherein the storage location is accessible by the VIM, and wherein the validation is performed by a placement engine that compares compute requirements in a Virtual Deployment Unit (VDU) for the VNF with compute capabilities at a cloud identified in a Network Service Descriptor (NSD).

14. The system of claim 13, the stages further comprising:
receiving an upgraded image for the VNF; and
deploying the upgraded image to the tracked storage location, wherein the VIM retrieves the updated image from the storage location to instantiate the VNF.

15. The system of claim 13, wherein the storage location is a content library associated with the VIM.

16. The system of claim 13, wherein the image metadata indicates edge deployment, and wherein the storage location is selected based on proximity to an edge node of the network.

17. The system of claim 13, the stages further comprising:
determining the image has not been used to instantiate the VNF for a threshold period of time; and
sending a message to the VIM to delete the image.

* * * * *